(No Model.)
J. T. KETCHUM.
PLOW.
No. 339,788. Patented Apr. 13, 1886.
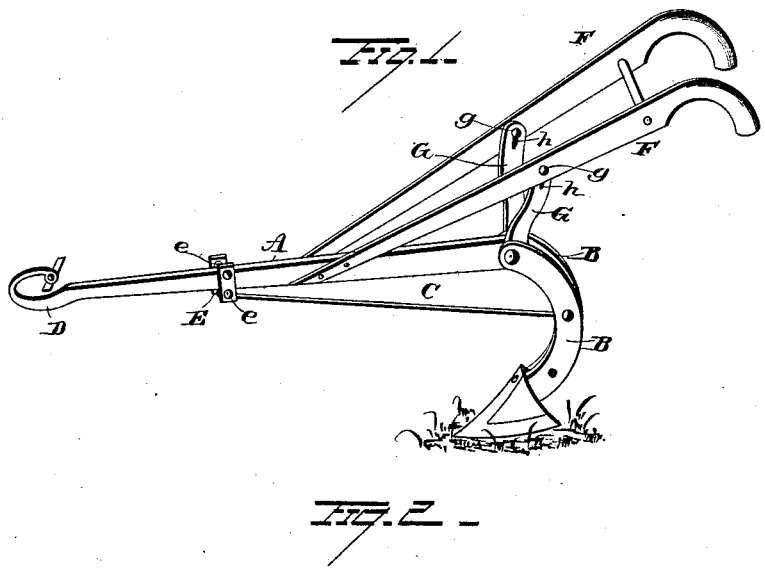
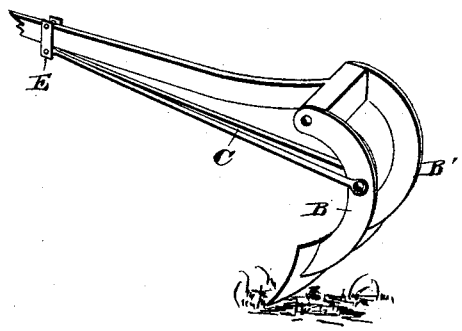
WITNESSES
Geo. F. Downing
J. E. Jones
INVENTOR
Joel T. Ketchum
B. Leggett & Leggett
Attorney

UNITED STATES PATENT OFFICE.

JOEL THOMAS KETCHUM, OF ROCKWALL, TEXAS.

PLOW.

SPECIFICATION forming part of Letters Patent No. 339,788, dated April 13, 1886.

Application filed January 8, 1886. Serial No. 187,975. (No model.)

*To all whom it may concern:*

Be it known that I, JOEL THOMAS KETCHUM, of Rockwall, in the county of Rockwall and State of Texas, have invented certain new and useful Improvements in Plows; and I do hereby declare the following to be a full, clear, and exact description of the invention, such as will enable others skilled in the art to which it appertains to make and use the same.

My invention relates to an improvement in plows.

The object is to provide a plow which may be readily and precisely adjusted to cut different depths, and in which the draft shall be applied at a point well down toward the center of resistance.

A further object is to provide means for regulating the depth of cut which will apply to two or even more plows attached to the same plow-beam.

With these ends in view my invention consists in certain features of construction and combinations of parts, as will be hereinafter described, and pointed out in the claim.

In the accompanying drawings, Figure 1 represents the plow in side elevation, and Fig. 2 is a partial rear view showing two plows attached to the same beam.

A represents a plow-beam, to the rear end of which the upper end of the standard B is pivotally secured. The standard B may either consist of a single curved bar or it may be a double-bar standard, one section being secured on each side of the beam. A rod, C, is attached at one end to the standard B at a point about half-way between the beam and plow, and leads from thence forwardly to a point on the plow-beam a short distance to the rear of the clevis D, where it is attached to a sliding clamp, E.

The clamp E preferably consists of a pair of side checks connected by draw-bolts *e*, one above and one below the beam. By loosening the nuts on the draw-bolts *e* and sliding the clamp E forwardly and backwardly on the tongue the standard B will be thereby swung forwardly or backwardly and the point of the plow thereby raised or lowered, causing it to cut a shallower or deeper furrow, as may be desired.

It will be observed that the rod C extends along the under side of the tongue in nearly the direct line of draft from the team to the center of resistance.

The plow-handles F are attached to the plow-beam at or near its central portion, and lead from thence upwardly and rearwardly to a point within convenient reach of the plowman.

A pair of braces, G, are secured at their lower ends to the rear end of the plow-beam, and branch outwardly and upwardly to meet the handles F, to which they are secured by bolts *g*. The upper ends of the braces G are provided with oblong vertical slots or with series of bolt-holes *h*, for the purpose of regulating the elevation of the handles.

When two plows are to be attached to the single beam, the rear end of the beam A' is provided with a cross-head, or with spacing-blocks to separate the standards B B', the rods leading from each of the standards to the common clamp E. This latter construction is convenient for use as a straddle-row plow, using either a double shovel or single mold-board plow on each of the standards, as the work may demand.

The whole construction is simple and inexpensive, and is adapted to general use on a farm.

It is evident that slight changes might be resorted to in the form and arrangement of the several parts described without departing from the spirit and scope of my invention; hence I do not wish to limit myself strictly to the construction herein set forth; but, Having fully described my invention, what I claim as new, and desire to secure by Letters Patent, is—

The combination, with a plow-beam, of a plow-standard pivotally secured to the rear end of said beam, a brace pivotally secured to the standard, and a sliding clamp for securing the front end of the brace to the beam, substantially as set forth.

In testimony whereof I have signed this specification in the presence of two subscribing witnesses.

JOEL THOMAS KETCHUM.

Witnesses:
JNO. W. ROBERTS,
WM. D. DAWSON.